United States Patent
Zhang et al.

(10) Patent No.: US 10,664,952 B2
(45) Date of Patent: May 26, 2020

(54) IMAGE PROCESSING METHOD, AND DEVICE, FOR PERFORMING COORDINATE CONVERSION

(71) Applicant: SHENZHEN INTELLIFUSION TECHNOLOGIES CO., LTD., Shenzhen (CN)

(72) Inventors: Yongsheng Zhang, Shenzhen (CN); Yang Zhou, Shenzhen (CN)

(73) Assignee: SHENZHEN INTELLIFUSION TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/627,765

(22) PCT Filed: Dec. 29, 2017

(86) PCT No.: PCT/CN2017/119948
§ 371 (c)(1),
(2) Date: Dec. 31, 2019

(87) PCT Pub. No.: WO2019/114044
PCT Pub. Date: Jun. 20, 2019

(65) Prior Publication Data
US 2020/0126181 A1    Apr. 23, 2020

(30) Foreign Application Priority Data
Dec. 13, 2017    (CN) .......................... 2017 1 1331454

(51) Int. Cl.
G06K 9/00    (2006.01)
G06T 3/20    (2006.01)
(Continued)

(52) U.S. Cl.
CPC .................. *G06T 3/20* (2013.01); *G06T 1/60* (2013.01); *G06T 3/4023* (2013.01); *G06T 5/50* (2013.01)

(58) Field of Classification Search
CPC ........... G06T 3/20; G06T 3/4023; G06T 5/50; G06T 1/60
See application file for complete search history.

(56) References Cited

U.S. PATENT DOCUMENTS 5,428,725 A     6/1995   Sugai et al.
2017/0287138 A1* 10/2017 Wakino ..................... G06T 1/60

FOREIGN PATENT DOCUMENTS

CN          1670766 A      9/2005
CN        101562006    * 10/2009  ............... G09G 3/36
(Continued)

OTHER PUBLICATIONS

International Search Report issued in corresponding international application No. PCT/CN2017/119948, dated Aug. 29, 2018.
(Continued)

Primary Examiner — Amara Abdi

(57) ABSTRACT

An image processing method includes: performing coordinate conversion to determine that a final image is to be obtained by processing target rows of data of a source image, wherein the target rows of data of the source image are stored in an external storage device; reading, from the external storage device, the data of the target rows of the source image to an internal storage device; and processing the data of the target rows of the source image in the internal storage device to obtain the final image. The invention performs coordinate conversion to determine data to be cached, such that a data caching operation is independent from a size of a region to be padded, and resources of the internal storage device required are reduced.

5 Claims, 4 Drawing Sheets

(51) Int. Cl.
G06T 5/50 (2006.01)
G06T 3/40 (2006.01)
G06T 1/60 (2006.01)

(56) References Cited

FOREIGN PATENT DOCUMENTS

| CN | 101562006 | A | 10/2009 | | |
|---|---|---|---|---|---|
| CN | 103188419 | A | 7/2013 | | |
| CN | 103617595 | A | 3/2014 | | |
| CN | 104361555 | * | 2/2015 | ........... | G06T 3/4007 |
| CN | 104361555 | A | 2/2015 | | |
| CN | 107194880 | A | 9/2017 | | |
| JP | 2012203363 | * | 10/2012 | ............. | G06F 12/08 |

OTHER PUBLICATIONS

Written Opinion of the International Searching Authority for No. PCT/CN2017/119948.
Initial publication with international Search Report for No. WO 2019/114044 A1, dated Jun. 20, 2019.

* cited by examiner

IMAGE PROCESSING METHOD, AND DEVICE, FOR PERFORMING COORDINATE CONVERSION

CROSS-REFERENCE TO RELATED APPLICATION

This application claims the benefit of priority from Chinese Patent Application No. 201711331454.7 entitled "IMAGE PROCESSING METHOD AND DEVICE, ELECTRONIC APPARATUS, AND COMPUTER READABLE STORAGE MEDIUM" and filed on Dec. 13, 2017, the content of which is hereby incorporated by reference in its entire by reference.

BACKGROUND

1. Technical Field

The present disclosure generally relates to image processing technology field, and especially relates to an image processing method, an image processing device, an electronic apparatus, and a computer readable storage medium.

2. Description of Related Art

According to usage scenarios, it is needed to perform filling processing on an image before or after it is scaled. Due to the limitation of on-chip storage resources, source images are usually stored in off-chip storage devices (i.e. external storage devices), when performing scaling processing on an image, a whole source image isn't read from an external storage device at one time to the on-chip storage device (i.e. internal storage devices), but, some rows of the source image are read first and performed scaling processing on them to store them in the external storage device, after that, another some rows of the source image can be read from the external storage device, and then stored back to the external storage device after scaling them, which is continued in turn until the whole source image is completed to be scaled.

When performing filling processing on an image before or after scaling it, a general method is to cache some rows of the image to the internal storage device from the external storage device, and then performing filling processing on them. However, in such method, it is needed to cache more rows of the image when its filling areas are larger, which is needed more on-chip storage resources.

SUMMARY

The technical problems to be solved: in view of the shortcomings of the related art, the present disclosure relates to an image processing method, an image processing device, an electronic apparatus, and a computer readable storage medium which can perform coordinate conversion to determine data to be cached, so that it can allow the data to be cached regardless of the size of the filling area, while reducing resource requirements for internal storage devices.

The technical solution adopted for solving technical problems of the present disclosure is:

an image processing method includes:

performing coordinate conversion to determine that a final image is to be obtained by processing data of target rows of a source image, wherein the source image is stored in an external storage device;

reading the data of the target rows of the source image to an internal storage device from the external storage device; and processing the data of the target rows of the source image in the internal storage device to obtain the final image.

In an alternative embodiment, after performing coordinate conversion to determine that a final image is to be obtained by processing data of target rows of a source image, the method further includes:

determining whether there are duplicate rows in the target rows of the source image;

if there are duplicate rows in the target rows of the source image, deleting the duplicate rows from the target rows to obtain remaining rows; and the step of reading the data of the target rows of the source image to an internal storage device from the external storage device, including:

reading data of the remaining rows of the source image to the internal storage device from the external storage device.

In an alternative embodiment, the step of performing coordinate conversion to determine that a final image is to be obtained by processing data of target rows of a source image, includes:

determining a first coordinate of a first intermediate image obtained by performing filling processing on the source image, according to a source coordinate of the source image; determining rows corresponding to the first coordinate as the target rows of the source image, and determining that the final image is to be obtained by performing scaling processing on the data of the target rows of the source image; and the step of processing the data of the target rows of the source image in the internal storage device to obtain the final image, including:

performing scaling processing on the data of the target rows of the source image in the internal storage device to obtain the final image.

In an alternative embodiment, the step of performing coordinate conversion to determine that a final image is to be obtained by processing data of target rows of a source image, includes:

a second coordinate of a second intermediate image obtained by performing filling processing on the source image, according to a source coordinate of the source image; determining a third coordinate of a third intermediate image obtained by performing scaling processing on the second intermediate image, according to the second coordinate; and determining rows corresponding to the third coordinate as the target rows of the source image, and determining that the final image is to be obtained by performing filling processing on the data of the target rows of the source image; and the step of processing the data of the target rows of the source image in the internal storage device to obtain the final image, including:

performing filling processing on the data of the target rows of the source image in the internal storage device to obtain the final image.

In an alternative embodiment, the filling processing includes constant filling processing, boundary value copying processing and boundary mirroring processing.

An electronic apparatus includes a memory configured to store computer programs, and a processor configured to perform the computer programs stored in the memory to implement the image processing method above mentioned.

A computer readable storage medium storing at least one instruction performed by a processor to implement the image processing method above mentioned.

An image processing device includes:

a determining unit configured to perform coordinate conversion to determine that a final image is to be obtained by processing data of target rows of a source image, wherein the source image is stored in an external storage device;

a reading unit configured to read the data of the target rows of the source image to an internal storage device from the external storage device; and a processing unit configured to process the data of the target rows of the source image in the internal storage device to obtain the final image.

In an alternative embodiment, the determining unit configured to perform coordinate conversion to determine that a final image is to be obtained by processing data of target rows of a source image, includes:

determining a first coordinate of a first intermediate image obtained by performing filling processing on the source image, according to a source coordinate of the source image; determining rows corresponding to the first coordinate as the target rows of the source image, and determining that the final image is to be obtained by performing scaling processing on the data of the target rows of the source image; and the processing unit configured to process the data of the target rows of the source image in the internal storage device to obtain the final image, including:

performing scaling processing on the data of the target rows of the source image in the internal storage device to obtain the final image.

In an alternative embodiment, the determining unit configured to perform coordinate conversion to determine that a final image is to be obtained by processing data of target rows of a source image, includes:

a second coordinate of a second intermediate image obtained by performing filling processing on the source image, according to a source coordinate of the source image; determining a third coordinate of a third intermediate image obtained by performing scaling processing on the second intermediate image, according to the second coordinate; and determining rows corresponding to the third coordinate as the target rows of the source image, and determining that the final image is to be obtained by performing filling processing on the data of the target rows of the source image; and the processing unit configured to process the data of the target rows of the source image in the internal storage device to obtain the final image, including:

performing filling processing on the data of the target rows of the source image in the internal storage device to obtain the final image.

According to the above technical scheme, in the present disclosure, before performing image processing on images, the electronic apparatus can be configured to perform coordinate conversion to determine that a final image is to be obtained by processing data of target rows of a source image, wherein the source image is stored in an external storage device; furthermore, the electronic apparatus can be configured to read the data of the target rows of the source image to an internal storage device from the external storage device, and then process the data of the target rows of the source image in the internal storage device to obtain the final image. It can be seen that, in an embodiment of the present disclosure, before performing image processing on images, the electronic apparatus can be configured to perform coordinate conversion to determine data to be cached, so that it can allow the data to be cached regardless of the size of the filling area, while reducing resource requirements for internal storage devices.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described embodiment of the present disclosure, all other embodiments obtained by one of ordinary skill in the related art on the premise of no creative work are within the protection scope of the present disclosure.

In order to make the above purposes, features and advantages of the present disclosure more obvious and thorough understand of the subject matter presented herein, the following is a further detailed description of the present disclosure in combination with the accompanying drawings and the specific implementation embodiments.

Furthermore, an electronic apparatus is a device capable of automatically performing numerical calculations and/or information processing in accordance with pre-set or stored instructions, whose hardware includes, but not limited to, a microprocessor, an Application Specific Integrated Circuit (ASIC), a field-programmable Gate Array (FPGA), a Digital Signal Processor (DSP), and an embedded device etc.

The electronic apparatus further includes, but not limited to, any electronic product for human-computer interaction by means of a keyboard, a mouse, a remote control, a touch pad or a voice control device such as person computers, tablet computers, smart phones, Personal Digital Assistants (PDAs), Internet Protocol Televisions (IPTVs), smart wearable devices and digital cameras etc.

Figure 1:
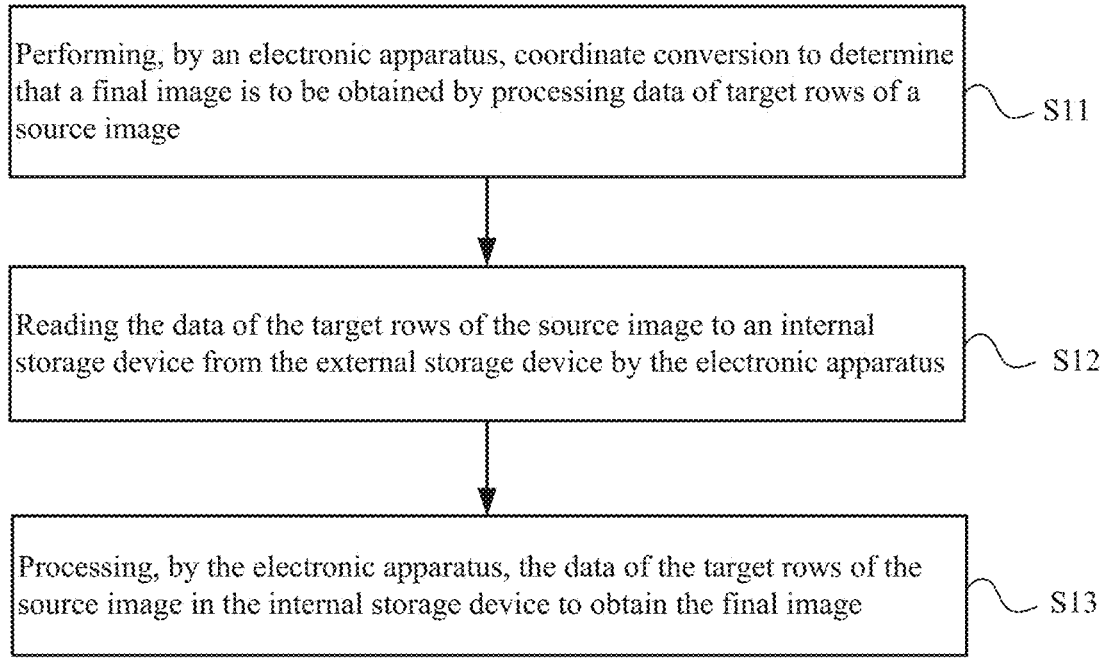
FIG. 1 is a flowchart of a image processing method in accordance with an embodiment disclosed in the present disclosure.

Referring to FIG. 1, it is an image processing method in accordance with an embodiment disclosed in the present disclosure. According to different requirements, the sequence of steps in the flowchart can be changed, and some steps can be omitted.

S11, an electronic apparatus performs coordinate conversion to determine that a final image is to be obtained by processing data of target rows of a source image.

Furthermore, the data of the target rows of the source image is stored in an external storage device.

Furthermore, the method described in the present disclosure can be applied in a plurality of situations, such as: a, performing filling processing on a source image and then performing scaling processing on the source image; b, performing scaling processing on a source image and then performing filling processing on the source image; c, firstly performing filling processing on a source image, secondly performing scaling processing on the source image, and finally performing filling processing on the source image. In general, it can be summarized that a source image can be performed filling processing on it before or after scaling it. Furthermore, the filling processing includes constant filling processing, boundary value copying processing and boundary mirroring processing.

Specifically, before performing image processing on images, the step of an electronic apparatus performs coordinate conversion to determine that a final image is to be obtained by processing data of target rows of a source image, includes:

determining a first coordinate of a first intermediate image obtained by performing filling processing on the source image, according to a source coordinate of the source image; determining rows corresponding to the first coordinate as the target rows of the source image, and determining that the final image is to obtained by performing scaling processing on the data of the target rows of the source image.

Furthermore, the source coordinate is mapped to the first coordinate, that is, the first coordinate can be represented by a functional expression of the source coordinate. Each coordinate is corresponding to a particular row and a particular column, and a row corresponding to the first coordinate can be understood as the row corresponding to a row coordinate which is corresponding to the first coordinate. Each coordinate in the first coordinate can find a same coordinate in the source coordinate.

An alternative embodiment of the present disclosure can be thought as a way to perform scaling processing on an image before it is scaled.

Figure 2:
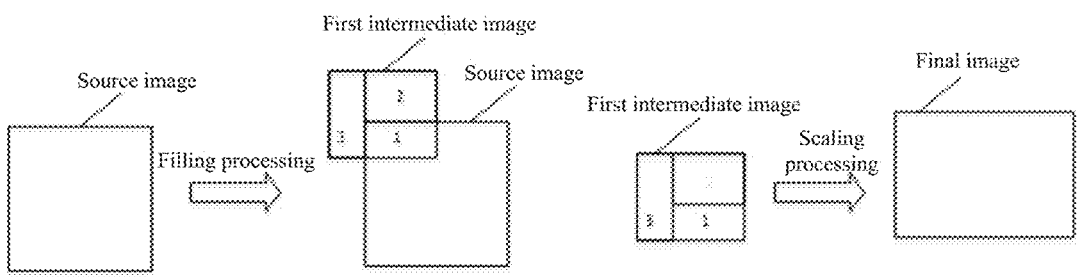
FIG. 2 is a schematic view of performing filling processing on an image before scaling it disclosed in the present disclosure.
Figure 3:
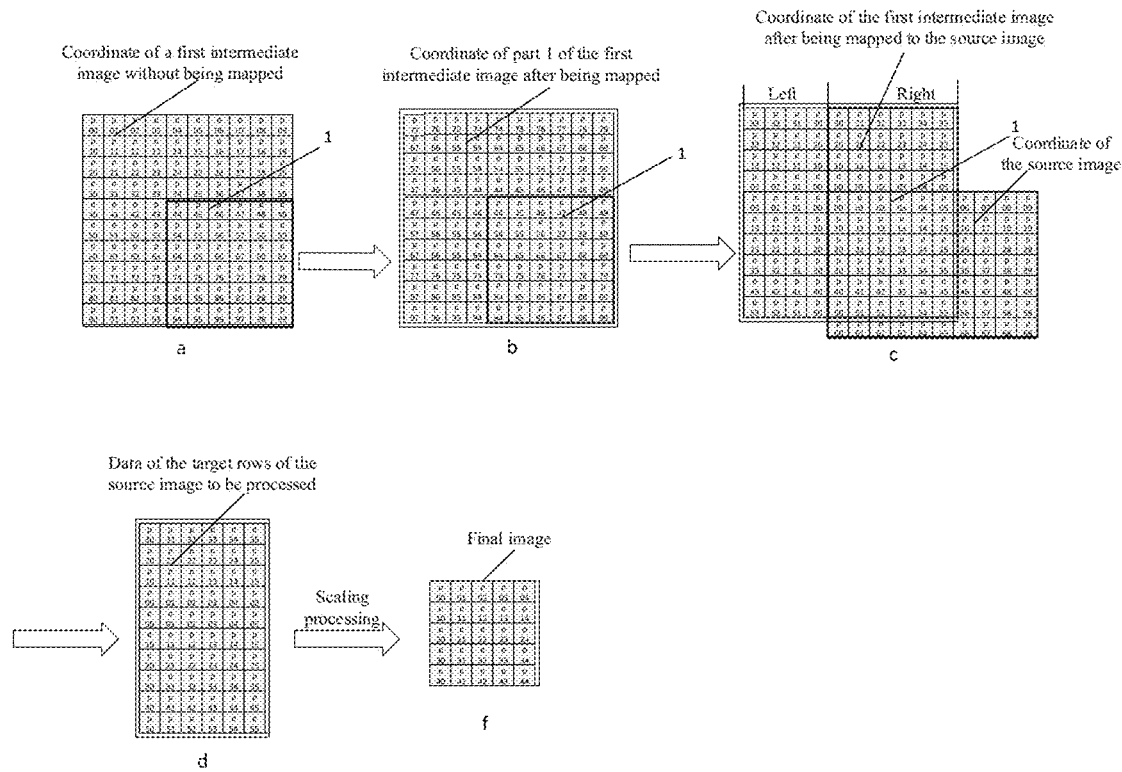
FIG. 3 is a schematic view of coordinate transformation disclosed in the present disclosure.

Referring to FIG. 2 and FIG. 3, FIG. 2 is a schematic view of performing filling processing on an image before scaling it disclosed in the present disclosure. FIG. 3 is a schematic view of coordinate transformation disclosed in the present disclosure. Furthermore, an embodiment of the filling processing shown in FIG. 2 is boundary mirroring processing. It should be noted, although the embodiment of the present disclosure is only shown what is enumerated in FIG. 2, it is not limited to what is enumerated in FIG. 2, it can include other filling methods, such as constant filling processing, boundary value copying processing, which are not described repeatedly here. FIG. 3 is a schematic view of coordinate transformation before the image processing of FIG. 2.

Referring to FIG. 2, the first intermediate image is obtained after the source image is filled, furthermore, part 1 of the first intermediate image is located in the source image, in order to obtain the first intermediate image, the part 1 is mirrored upward to obtain part 2 of the first intermediate image, and then mirrored left to obtain part 3 of the first intermediate image, in this way, the first intermediate image can be obtained via completing filling processing on the source image. And then, it can be performed scaling processing on the first intermediate image to obtain the final image.

Referring to FIG. 3, an original coordinate is included in the first intermediate image before mapping it (figure a shown in FIG. 3), the part 1 of the first intermediate image is located in the source image, after mirroring the part 1 of the first intermediate image upward, and then mirroring the part 1 left, the coordinates are accordingly mapped to obtain figure b shown in FIG. 3, and then the figure b is mapped to the source image to obtain figure c shown in FIG. 3, since data of the left part of the figure c can be mapped to its right part via coordinate conversion, it can only need to read the data of the right part (as shown figure d of FIG. 3) rather than needing to read the data of the left part during reading the data, and then it is performed scaling processing on the read data, so as to obtain the final image (as shown figure f of FIG. 3).

It can be seen from FIG. 2 and FIG. 3 that the final image can be obtained by performing scaling processing on the first intermediate image, and the first intermediate image can be obtained by performing filling processing on the source image, the coordinate of the first intermediate image can be represented by the coordinate of the source image, and then the coordinate of the final image can also be represented by the coordinate of the source image, thus, it is can be known which rows of the source image are processed to the final image to read them in the internal storage device for calculation.

Specifically, before performing image processing on images, the step of the electronic apparatus configured to perform coordinate conversion to determine that a final image is to be obtained by processing data of target rows of a source image, includes:

a second coordinate of a second intermediate image obtained by performing filling processing on the source image, according to a source coordinate of the source image; determining a third coordinate of a third intermediate image after the second intermediate image is scaled according to the second coordinate of the second intermediate image; determining rows corresponding to the third coordinate as the target rows of the source image, and determining that the final image is to obtained by performing filling processing on the data of the target rows of the source image.

Furthermore, the source coordinate is mapped to the second coordinate, that is, the second coordinate can be represented by a functional expression of the source coordinate. Each coordinate is corresponding to a particular row and a particular column, and a row corresponding to the third coordinate can be understood as the row corresponding to a row coordinate which is corresponding to the third coordinate. Each coordinate in the third coordinate can find a same coordinate in the source coordinate.

An alternative embodiment of the present disclosure can be thought as a way to perform scaling processing on an image after it is scaled.

Figure 4:
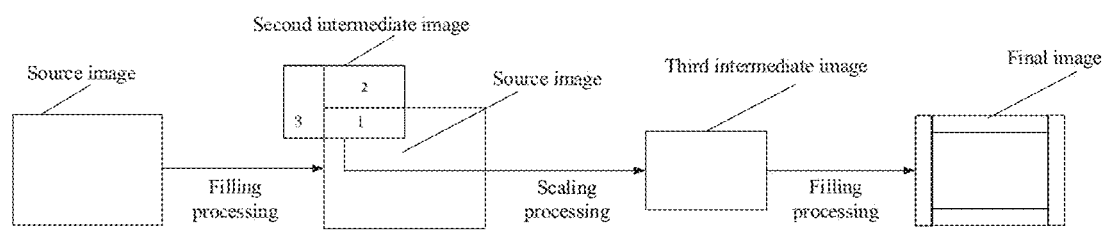
FIG. 4 is a schematic view of performing filling processing on an image after scaling it disclosed in the present disclosure.
Figure 5:
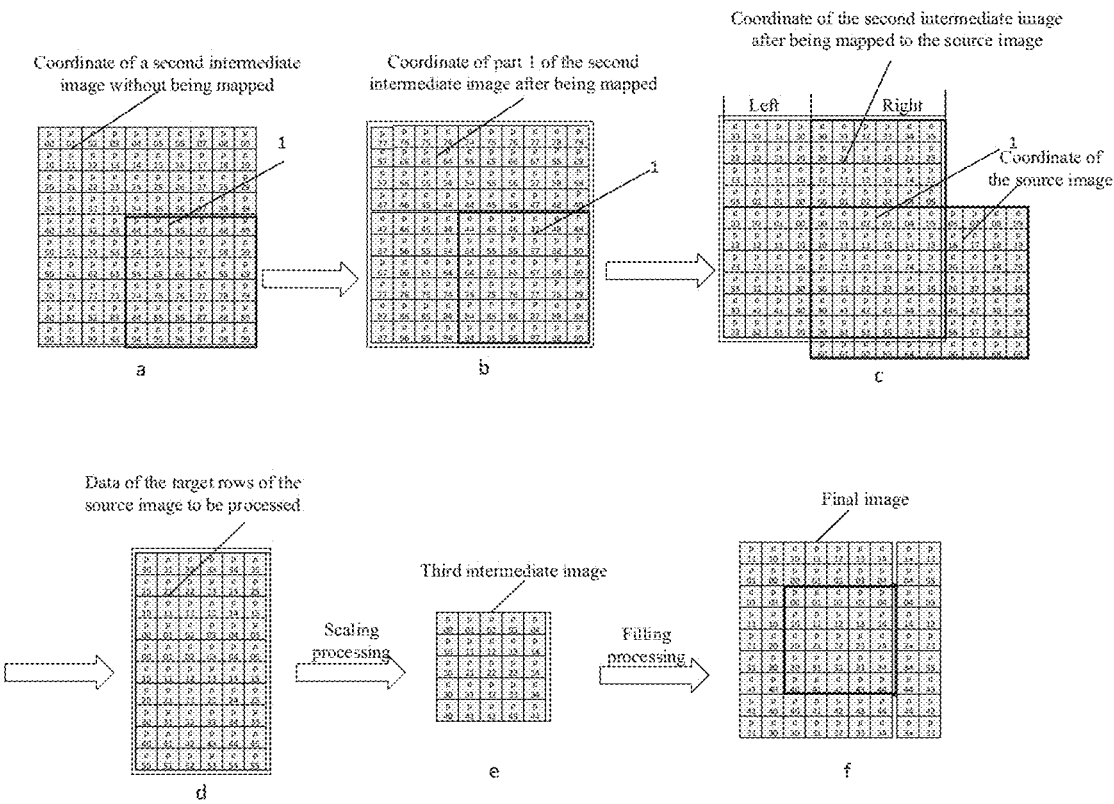
FIG. 5 is a schematic view of another coordinate transformation disclosed in the present disclosure.

Referring to FIG. 4 and FIG. 5, FIG. 4 is a schematic view of performing filling processing on an image after scaling it disclosed in the present disclosure. FIG. 5 is a schematic view of another coordinate transformation disclosed in the present disclosure. Furthermore, an embodiment of the filling processing shown in FIG. 4 is boundary mirroring processing. It should be noted although the embodiment of the present disclosure is only shown what is enumerated in FIG. 4, it is not limited to what is enumerated in FIG. 4, it can include other filling methods, such as constant filling processing, boundary value copying processing, which are not described repeatedly here. FIG. 5 is a schematic view of coordinate transformation before the image processing shown in FIG. 4.

Referring to FIG. 4, the second intermediate image is obtained after the source image is filled, furthermore, part 1 of the second intermediate image is located in the source image, in order to obtain the second intermediate image, the part 1 is mirrored upward to obtain part 2 of the second intermediate image, and then mirrored left to obtain part 3 of the second intermediate image, in this way, the second intermediate image can be obtained via completing filling processing on the source image. And then, it can be performed scaling processing on the second intermediate image to obtain the third image, finally, it can be performed filling processing on the third intermediate image to obtain the third image.

Referring to FIG. 5, an original coordinate is included in the second intermediate image before mapping it (figure a shown in FIG. 5), the part 1 of the second intermediate image is located in the source image, after mirroring the part 1 of the second intermediate image upward, and then mirroring the part 1 left, the coordinate are accordingly mapped to obtain figure b shown in FIG. 5, and then the figure b is mapped to the source image to obtain figure c shown in FIG. 5, since data of the left part of the figure c can be mapped to its right part via coordinate conversion, it can only need to read the data of the right part (as shown figure d of FIG. 5) rather than needing to read the data of the left part during reading the data, and then it is performed scaling processing on the read data, so as to obtain the third intermediate image (as shown figure e of FIG. 5). Furthermore, it is performed filling processing on the third intermediate image, so as to obtain the final image (as shown figure f of FIG. 5).

It can be seen from FIG. 4 and FIG. 5 that the final image can be obtained by performing filling processing on the third intermediate image, the third intermediate image can be obtained by performing scaling processing on the second intermediate image, and the second intermediate image can be obtained by performing filling processing on the source image, the coordinate of the second intermediate image can be represented by the coordinate of the source image, and then the coordinate of the third intermediate image can be represented by the coordinate of the source image, finally, the coordinate of the final image can also be represented by the coordinate of the source image, thus, it is can be known which rows of the source image are processed to the final image to read them to the internal storage device for calculation.

S12, reading the data of the target rows of the source image to an internal storage device from the external storage device by the electronic apparatus.

Furthermore, the external storage device is referred to storage devices other than internal storage devices of computers and CPU cache, and it is characterized with large capacity, low price and slow access speed, and configured to store programs and data which are temporarily unused, in general, the data can still be saved after its power turned down. The external storage device can include, but not limited to, Dual Data Rate Dynamic Random-Access Memories (DDR SDRAMs), hard disks, floppy disks, optical disks, U disks, etc.

Furthermore, the internal storage device can include, but not limited to, Random-Access Memories (DDR SDRAMs), Synchronous Dynamic Random-Access Memories (SDRAMs) and CACHEs.

In the present disclosure, the electronic apparatus can be configured to read the data of the target rows of the source image from the external storage device to the internal storage device several times according to requirement of algorithm. For example: two rows of data are read at a time from the external storage device to the internal storage device. Furthermore, image scaling algorithms can include, but not limited to, birowar interpolation algorithm, nearest neighbor interpolation algorithm and higher-order interpolation algorithm.

S13, processing, by the electronic apparatus, the data of the target rows of the source image in the internal storage device to obtain the final image.

The image processing method of the present disclosure can be used to cases of performing filling processing on images before scaling the images, the step of processing, by the electronic apparatus, the data of the target rows of the source image in the internal storage device to obtain the final image, includes:

performing scaling processing on the data of the target rows of the source image in the internal storage device to obtain the final image.

The image processing method of the present disclosure can be used to cases of performing filling processing on images after scaling the images, the step of processing, by the electronic apparatus, the data of the target rows of the source image in the internal storage device to obtain the final image, includes:

performing filling processing on the data of the target rows of the source image in the internal storage device to obtain the final image.

As an alternative embodiment, after the step S11 of performing coordinate conversion to determine that a final image is to be obtained by processing data of target rows of a source image, the method further includes:

determining whether there are duplicate rows in the target rows of the source image;

if there are duplicate rows in the target rows of the source image, deleting the duplicate rows from the target rows to obtain remaining rows; and the step of reading the data of the target rows of the source image to an internal storage device from the external storage device, including:

reading data of the remaining rows of the source image to the internal storage device from the external storage device.

In an alternative embodiment, after it is determined that the final image that the final image is to be obtained by processing the data of the target rows of the source image, since the image filling processing includes the constant filling processing, the boundary value copying processing and the boundary mirroring processing, such filling processing can inevitably produce some duplicate data so that the data of target rows can also produce duplicate data. Therefore, before reading data, it can first determine whether there are duplicate rows in the target rows of the source image, if there are, the duplicate rows can be deleted from the target row to obtain the remaining rows, and then the remaining rows can be read from the external storage device to the internal storage device, thereby eliminating requirement of cache more rows of data, reducing access to the external storage device, reducing bandwidth requirements, and saving power.

In the image processing method as shown in FIG. 1, before performing image processing on images, the electronic apparatus can be configured to perform coordinate conversion to determine that a final image is to be obtained by processing data of target rows of a source image, wherein the source image is stored in an external storage device; furthermore, the electronic apparatus can be configured to read the data of the target rows of the source image to an internal storage device from the external storage device, and then process the data of the target rows of the source image in the internal storage device to obtain the final image. It can be seen that, in an embodiment of the present disclosure, before performing image processing on images, the electronic apparatus can be configured to perform coordinate conversion to determine data to be cached, so that it can allow the data to be cached regardless of the size of the filling area, while reducing resource requirements for internal storage devices.

Figure 6:
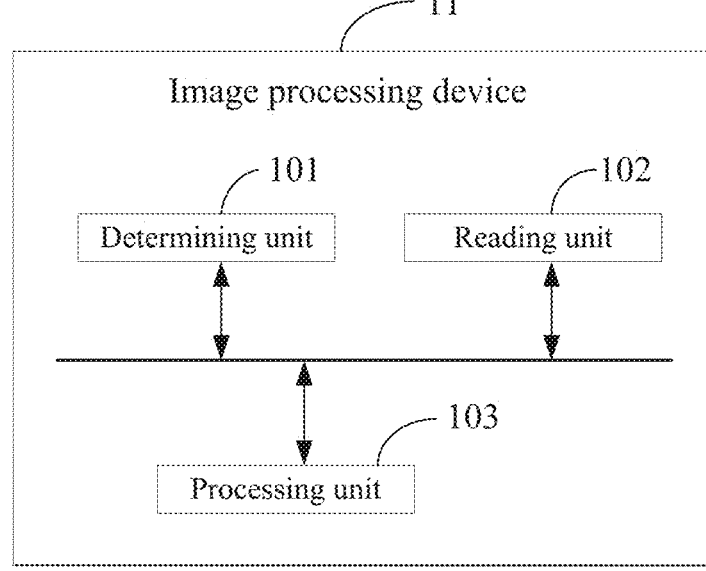
FIG. 6 is a function block diagram of an image processing device in accordance with an embodiment disclosed in the present disclosure.

Referring to FIG. 6, it is a function block of the image processing device in accordance with an embodiment disclosed in the present disclosure. Furthermore, the image processing device shown in FIG. 6 is configured to perform some or all steps of the image processing method described in FIG. 1, it can be seen for details from the relevant description in FIG. 1, not repeating it here. Furthermore, a unit described in the present disclosure is a series of computer programs stored in a memory that can be performed by a processor to implement fixed functions. In an embodiment of the present disclosure, the functions of each unit can be subsequently described in details.

The image processing device 11 shown in FIG. 6 includes:

A determining unit 101 is configured to perform coordinate conversion to determine that a final image is to be obtained by processing data of target rows of a source image.

Furthermore, the data of the target rows of the source image is stored in an external storage device.

Furthermore, the method described in the present disclosure can be applied in a plurality of situations, such as: a, performing filling processing on a source image and then performing scaling processing on the source image; b, performing scaling processing on a source image and then performing filling processing on the source image; c, firstly performing filling processing on a source image, secondly performing scaling processing on the source image, and finally performing filling processing on the source image. In general, it can be summarized that a source image can be performed filling processing on it before or after scaling it. Furthermore, the filling processing includes constant filling processing, boundary value copying processing and boundary mirroring processing.

A reading unit 102 is configured to read the data of the target rows of the source image to an internal storage device from the external storage device.

Furthermore, the external storage device is referred to storage devices other than internal storage devices of computers and CPU cache, and it is characterized with large capacity, low price and slow access speed, and configured to store programs and data which are temporarily unused, in general, the data can still be saved after its power turned down. The external storage device can include, but not limited to, Dual Data Rate Dynamic Random-Access Memories (DDR SDRAMs), hard disks, floppy disks, optical disks, U disks, etc.

Furthermore, the internal storage device can include, but not limited to, Random-Access Memories (DDR SDRAMs), Synchronous Dynamic Random-Access Memories (SDRAMs) and CACHEs.

In the present disclosure, the electronic apparatus can be configured to read the data of the target rows of the source image from the external storage device to the internal storage device several times according to requirement of algorithm. For example: two rows of data are read at a time from the external storage device to the internal storage device. Furthermore, image scaling algorithms can include, but not limited to, birowar interpolation algorithm, nearest neighbor interpolation algorithm and higher-order interpolation algorithm.

A processing unit 103 is configured to process the data of the target rows of the source image in the internal storage device to obtain the final image.

Specifically, the determining unit 101 configured to perform coordinate conversion to determine that the final image is to be obtained by processing the data of the target rows of the source image, includes:

determining a first coordinate of a first intermediate image obtained by performing filling processing on the source image, according to a source coordinate of the source image; determining rows corresponding to the first coordinate as the target rows of the source image, and determining that the final image is to be obtained by performing scaling processing on the data of the target rows of the source image.

Furthermore, the source coordinate is mapped to the first coordinate, that is, the first coordinate can be represented by a functional expression of the source coordinate. Each coordinate is corresponding to a particular row and a particular column, and a row corresponding to the first coordinate can be understood as the row corresponding to a row coordinate which is corresponding to the first coordinate. Each coordinate in the first coordinate can find a same coordinate in the source coordinate.

Referring to FIG. 2 and FIG. 3, FIG. 2 is a schematic view of performing filling processing on an image before scaling it disclosed in the present disclosure. FIG. 3 is a schematic view of coordinate transformation disclosed in the present disclosure. Furthermore, an embodiment of the filling processing shown in FIG. 2 is boundary mirroring processing. It should be noted although the embodiment of the present disclosure is only shown what is enumerated in FIG. 2, it is not limited to what is enumerated in FIG. 2, it can include other filling methods, such as constant filling processing, boundary value copying processing, which are not described repeatedly here. FIG. 3 is a schematic view of coordinate transformation before the image processing shown in FIG. 2.

Referring to FIG. 2, the first intermediate image is obtained after the source image is filled, furthermore, part 1 of the first intermediate image is located in the source image, in order to obtain the first intermediate image, the part 1 is mirrored upward to obtain part 2 of the first intermediate image, and then mirrored left to obtain part 3 of the first intermediate image, in this way, the first intermediate image can be obtained via completing filling processing on the source image. And then, it can be performed scaling processing on the first intermediate image to obtain the final image.

Referring to FIG. 3, an original coordinate is included in the first intermediate image before mapping it (figure a shown in FIG. 3), the part 1 of the first intermediate image is located in the source image, after mirroring the part 1 of the first intermediate image upward, and then mirroring the part 1 left, the coordinate are accordingly mapped to obtain figure b shown in FIG. 3, and then the figure b is mapped to the source image to obtain figure c shown in FIG. 3, since data of the left part of the figure c can be mapped to its right part via coordinate conversion, it can only need to read the data of the right part (as shown figure d of FIG. 3) rather than needing to read the data of the left part during reading the data, and then it is performed scaling processing on the read data, so as to obtain the final image (as shown figure f of FIG. 3).

It can be seen from FIG. 2 and FIG. 3 that the final image can be obtained by performing scaling processing on the first intermediate image, and the first intermediate image can be obtained by performing filling processing on the source image, the coordinate of the first intermediate image can be represented by the coordinate of the source image, and then the coordinates of the final image can also be represented by the coordinates of the source image, thus, it is can be known which rows of the source image are processed to the final image to read them into the internal storage device for calculation.

The processing unit 103 configured to process the data of the target rows of the source image in the internal storage device to obtain the final image, includes:

performing scaling processing on the data of the target rows of the source image in the internal storage device to obtain the final image.

Furthermore, the processing unit 103 can be used to cases of performing filling processing on images before scaling the images.

Specifically, the determining unit 101 configured to perform coordinate conversion to determine that the final image is to be obtained by processing data of target rows of the source image, includes:

a second coordinate of a second intermediate image obtained by performing filling processing on the source image, according to a source coordinate of the source image; determining a third coordinate of a third intermediate image obtained by performing scaling processing on the second intermediate image, according to the second coordinate; and determining rows corresponding to the third coordinate as the target rows of the source image, and determining that the final image is to be obtained by performing filling processing on the data of the target rows of the source image.

Furthermore, the source coordinate is mapped to the second coordinate, that is, the second coordinate can be represented by a functional expression of the source coordinate. Each coordinate is corresponding to a particular row and a particular column, and a row corresponding to the third coordinate can be understood as the row corresponding to a row coordinate which is corresponding to the third coordinate. Each coordinate in the third coordinate can find a same coordinate in the source coordinate.

An alternative embodiment of the present disclosure can be thought as a way to perform scaling processing on an image after it is scaled.

Referring to FIG. 4 and FIG. 5, FIG. 4 is a schematic view of performing filling processing on an image after scaling it disclosed in the present disclosure. FIG. 5 is a schematic view of another coordinate transformation disclosed in the present disclosure. Furthermore, an embodiment of the filling processing shown in FIG. 4 is boundary mirroring processing. It should be noted although the embodiment of the present disclosure is only shown what is enumerated in FIG. 4, it is not limited to what is enumerated in FIG. 4, it can include other filling methods, such as constant filling processing, boundary value copying processing, which are not described repeatedly here. FIG. 5 is a schematic view of coordinate transformation before the image processing shown in FIG. 4.

Referring to FIG. 4, the second intermediate image is obtained after the source image is filled, furthermore, part 1 of the second intermediate image is located in the source image, in order to obtain the second intermediate image, the part 1 is mirrored upward to obtain part 2 of the second intermediate image, and then mirrored left to obtain part 3 of the second intermediate image, in this way, the second intermediate image can be obtained via completing filling processing on the source image. And then, it can be performed scaling processing on the second intermediate image to obtain the third image, finally, it can be performed filling processing on the third intermediate image to obtain the third image.

Referring to FIG. 5, an original coordinate is included in the second intermediate image before mapping it (figure a shown in FIG. 5), the part 1 of the second intermediate image is located in the source image, after mirroring the part 1 of the second intermediate image upward, and then mirroring the part 1 left, the coordinate are accordingly mapped to obtain figure b shown in FIG. 5, and then the figure b is mapped to the source image to obtain figure c shown in FIG. 5, since data of the left part of the figure c can be mapped to its right part via coordinate conversion, it can only need to read the data of the right part (as shown figure d of FIG. 5) rather than needing to read the data of the left part during reading the data, and then it is performed scaling processing on the read data, so as to obtain the third intermediate image (as shown figure e of FIG. 5). Furthermore, it is performed filling processing on the third intermediate image, so as to obtain the final image (as shown figure f of FIG. 5).

It can be seen from FIG. 4 and FIG. 5 that the final image can be obtained by performing filling processing on the third intermediate image, the third intermediate image can be obtained by performing scaling processing on the second intermediate image, and the second intermediate image can be obtained by performing filling processing on the source image, the coordinate of the second intermediate image can be represented by the coordinate of the source image, and then the coordinate of the third intermediate image can be represented by the coordinate of the source image, finally, the coordinate of the final image can also be represented by the coordinate of the source image, thus, it is can be known which rows of the source image are processed to the final image to read them into the internal storage device for calculation.

The processing unit 103 configured to process the data of the target rows of the source image in the internal storage device to obtain the final image, includes:

performing filing processing on the data of the target rows of the source image in the internal storage device to obtain the final image.

Furthermore, the processing unit 103 can be used to cases of performing filling processing on images after scaling the images.

As an alternative embodiment, the image processing device 11 shown in FIG. 6 can further include:

a judging unit configured to determine whether there are duplicate rows in the target rows of the source image;

a deleting unit configured to delete duplicate rows from the target rows to obtain remaining rows when that there are duplicate rows in the target rows of the source image judged by the judging unit;

the reading unit 102 configured to read the data of the target rows of the source image to an internal storage device from the external storage device, includes:

reading data of the remaining rows of the source image to the internal storage device from the external storage device.

In an alternative embodiment, after it is determined that the final image is to be obtained by processing the data of the target rows of the source image, since the image filling processing includes the constant filling processing, the boundary value copying processing and the boundary mirroring processing, such filling processing can inevitably produce some duplicate data so that the data of target rows can also produce duplicate data. Therefore, before reading data, it can first determine whether there are duplicate rows in the target rows of the source image, if there are, the duplicate rows can be deleted from the target row to obtain the remaining rows, and then the remaining rows can be read from the external storage device to the internal storage device, thereby eliminating requirement of cache more rows of data, reducing access to the external storage device, reducing bandwidth requirements, and saving power.

In the image processing device 11 as shown in FIG. 6, before performing image processing on images, the electronic apparatus can be configured to perform coordinate conversion to determine that a final image is to be obtained by processing data of target rows of a source image, wherein the source image is stored in an external storage device; furthermore, the electronic apparatus can be configured to read the data of the target rows of the source image to an internal storage device from the external storage device, and then process the data of the target rows of the source image in the internal storage device to obtain the final image. It can be seen that, in an embodiment of the present disclosure, before performing image processing on images, the electronic apparatus can be configured to perform coordinate conversion to determine data to be cached, so that it can allow the data to be cached regardless of the size of the filling area, while reducing resource requirements for internal storage devices.

The integrated unit, implemented in the form of software functional modules, can be stored in a computer readable storage medium. Furthermore, the computer readable storage medium can be configured to store computer programs which are performed by a processor to implement the steps of the method described in the above embodiments. The computer program includes computer program codes which can be shown in source codes, object codes, executable files or some intermediate forms, etc. The computer readable storage medium can include: any entity or devices with the computer program codes, recording mediums, U disks, mobile hard disks, disks, CDs, computer memories, Read-Only Memories (ROMs), Random Access Memories (RAMs), electronic carrier signals, telecommunication signals and software distribution medias, etc. It should be noted that contents within the computer readable storage medium can be increased or decreased as appropriate as required by the legislation and patent practice in the jurisdiction, for example, in some jurisdictions, computer readable media can't include electronic carrier signals and telecommunications signals according to legislation and patent practice.

Figure 7:
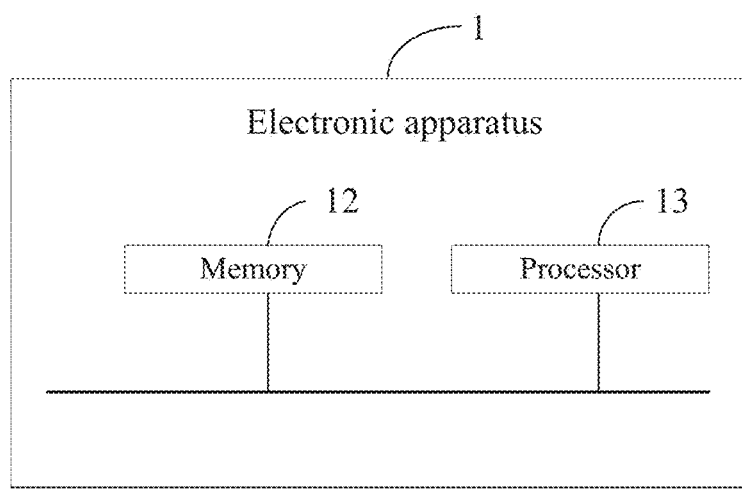
FIG. 7 is a schematic view of an electronic apparatus configured to realize an image processing method in accordance with an embodiment disclosed in the present disclosure.

Referring to FIG. 7, it is a schematic view of an electronic apparatus configured to realize the image processing method in accordance with an embodiment disclosed in the present disclosure. The electronic apparatus 1 includes a memory 12 and a processor 13. It can be understood for one of ordinary skill in the related art that the diagram shown in FIG. 7 is a merely schematic example of the electronic apparatus 1 of the present disclosure, but not intended to limit the protection scope of the electronic apparatus 1. It can include more or less parts than that of being shown in FIG. 7, or a combination of parts, or different parts, for example, the electronic apparatus 1 can also include input/output devices, network access devices, buses etc.

The electronic apparatus 1 further includes, but not limited to, any electronic product for human-computer interaction by means of a keyboard, a mouse, a remote control, a touch pad or a voice control device such as person computers, tablet computers, smart phones, Personal Digital Assistants (PDAs), consoles, Internet Protocol Televisions (IPTVs), smart wearable devices etc. The Network of the electronic apparatus 1 can include, but not limited to, the Internet, wide area Network, metropolitan area Network, local area Network, Virtual Private Network (VPN), etc.

The memory 12 alternatively includes one or more computer readable storage mediums for storing programs and various data of the panoramic sea view monitoring method, and further can achieve high-speed and automatic access to programs or data during operating the electronic apparatus 1. The memory 12 alternatively includes a high speed random access memory and also alternatively includes a non-volatile memory such as one or more disk storage devices, flash storage devices, or other non-volatile solid-state storage devices.

The processor 13, also known as a CPU (Central Processing Unit), is a very large scale integrated circuit which is a core of operation and a control unit of the electronic apparatus 1. The processor 13 can be configured to perform operation systems of the electronic apparatus 1 and various applications and program codes etc installed therein, such as the image processing device 11.

Referring to FIG. 1, the memory 12 of the electronic apparatus 1 is configured to store a plurality of instructions to implement the image processing method, and the processor 13 is configured to perform the plurality of instructions to implement:

performing coordinate conversion to determine that a final image is to be obtained by processing data of target rows of a source image, wherein the source image is stored in an external storage device;

reading the data of the target rows of the source image to an internal storage device from the external storage device; and processing the data of the target rows of the source image in the internal storage device to obtain the final image.

Furthermore, the method described in the present disclosure can be applied in a plurality of situations, such as: a, performing filling processing on a source image and then performing scaling processing on the source image; b, performing scaling processing on a source image and then performing filling processing on the source image; c, firstly performing filling processing on a source image, secondly performing scaling processing on the source image, and finally performing filling processing on the source image. In general, it can be summarized that a source image can be performed filling processing on it before or after scaling it. Furthermore, the filling processing includes constant filling processing, boundary value copying processing and boundary mirroring processing.

Furthermore, the external storage device is referred to storage devices other than internal storage devices of computers and CPU cache, and it is characterized with large capacity, low price and slow access speed, and configured to store programs and data which are temporarily unused, in general, the data can still be saved after its power turned down. The external storage device can include, but not limited to, Dual Data Rate Dynamic Random-Access Memories (DDR SDRAMs), hard disks, floppy disks, optical disks, U disks, etc.

Furthermore, the internal storage device can include, but not limited to, Random-Access Memories (DDR SDRAMs), Synchronous Dynamic Random-Access Memories (SDRAMs) and CACHEs.

In the present disclosure, the electronic apparatus can be configured to read the data of the target rows of the source image from the external storage device to the internal storage device several times according to requirement of algorithm. For example: two rows of data are read at a time from the external storage device to the internal storage device. Furthermore, image scaling algorithms can include, but not limited to, birowar interpolation algorithm, nearest neighbor interpolation algorithm and higher-order interpolation algorithm.

The image processing method of the present disclosure can be used to cases of performing filling processing on images before scaling the images, the electronic apparatus is configured to perform scaling processing on the data of the target rows of the source image in the internal storage device to obtain the final image. The image processing method of the present disclosure can be used to cases of performing filling processing on images after scaling the images, the electronic apparatus is configured to perform filling processing on the data of the target rows of the source image in the internal storage device to obtain the final image.

In an alternative embodiment, the processor 13 can be configured to perform the plurality of instructions to implement:

after performing coordinate conversion to determine that the final image is to be obtained by processing data of target rows of the source image, the method further includes:

determining whether there are duplicate rows in the target rows of the source image;

if there are duplicate rows in the target rows of the source image, deleting the duplicate rows from the target rows to obtain remaining rows; and the step of reading the data of the target rows of the source image to an internal storage device from the external storage device, including:

reading data of the remaining rows of the source image to the internal storage device from the external storage device.

In an alternative embodiment, after it is determined that the final image that the final image is to be obtained by processing the data of the target rows of the source image, since the image filling processing includes the constant filling processing, the boundary value copying processing and the boundary mirroring processing, such filling processing can inevitably produce some duplicate data so that the data of target rows can also produce duplicate data. Therefore, before reading data, it can first determine whether there are duplicate rows in the target rows of the source image, if there are, the duplicate rows can be deleted from the target row to obtain the remaining rows, and then the remaining rows can be read from the external storage device to the internal storage device, thereby eliminating requirement of cache more rows of data, reducing access to the external storage device, reducing bandwidth requirements, and saving power.

In an alternative embodiment, the step of performing coordinate conversion to determine that the final image is to be obtained by processing the data of the target rows of the source image, includes:

determining a first coordinate of a first intermediate image obtained by performing filling processing on the source image, according to a source coordinate of the source image; determining rows corresponding to the first coordinate as the target rows of the source image, and determining that the final image is to be obtained by performing scaling processing on the data of the target rows of the source image.

the step of processing the data of the target rows of the source image in the internal storage device to obtain the final image, including:

performing scaling processing on the data of the target rows of the source image in the internal storage device to obtain the final image.

Furthermore, the source coordinate is mapped to the first coordinate, that is, the first coordinate can be represented by a functional expression of the source coordinate. Each coordinate is corresponding to a particular row and a particular column, and a row corresponding to the first coordinate can be understood as the row corresponding to a row coordinate which is corresponding to the first coordinate.

An alternative embodiment of the present disclosure can be thought as a way to perform scaling processing on an image before it is scaled.

Referring to FIG. 2 and FIG. 3, FIG. 2 is a schematic view of performing filling processing on an image before scaling it disclosed in the present disclosure. FIG. 3 is a schematic view of coordinate transformation disclosed in the present disclosure. Furthermore, an embodiment of the filling processing shown in FIG. 2 is boundary mirroring processing. It should be noted although the embodiment of the present disclosure is only shown what is enumerated in FIG. 2, it is not limited to what is enumerated in FIG. 2, it can include other filling methods, such as constant filling processing, boundary value copying processing, which are not described repeatedly here. FIG. 3 is a schematic view of coordinate transformation before the image processing shown in FIG. 2.

Referring to FIG. 2, the first intermediate image is obtained after the source image is filled, furthermore, part 1 of the first intermediate image is located in the source image, in order to obtain the first intermediate image, the part 1 is mirrored upward to obtain part 2 of the first intermediate image, and then mirrored left to obtain part 3 of the first intermediate image, in this way, the first intermediate image can be obtained via completing filling processing on the source image. And then, it can be performed scaling processing on the first intermediate image to obtain the final image.

Referring to FIG. 3, an original coordinate is included in the first intermediate image before mapping it (figure a shown in FIG. 3), the part 1 of the first intermediate image is located in the source image, after mirroring the part 1 of the first intermediate image upward, and then mirroring the part 1 left, the coordinate are accordingly mapped to obtain figure b shown in FIG. 3, and then the figure b is mapped to the source image to obtain figure c shown in FIG. 3, since data of the left part of the figure c can be mapped to its right part via coordinate conversion, it can only need to read the data of the right part (as shown figure d of FIG. 3) rather than needing to read the data of the left part during reading the data, and then it is performed scaling processing on the read data, so as to obtain the final image (as shown figure f of FIG. 3).

It can be seen from FIG. 2 and FIG. 3 that the final image can be obtained by performing scaling processing on the first intermediate image, and the first intermediate image can be obtained by performing filling processing on the source image, the coordinate of the first intermediate image can be represented by the coordinate of the source image, and then the coordinate of the final image can also be represented by the coordinate of the source image, thus, it is can be known which rows of the source image are processed to the final image to read them into the internal storage device for calculation.

As an alternative embodiment, the step of performing coordinate conversion to determine that a final image is to be obtained by processing data of target rows of a source image, includes:

a second coordinate of a second intermediate image obtained by performing filling processing on the source image, according to a source coordinate of the source image;

determining a third coordinate of a third intermediate image after the second intermediate image is scaled according to the second coordinate of the second intermediate image; determining rows corresponding to the third coordinate as the target rows of the source image, and determining that the final image is to obtained by performing filling processing on the data of the target rows of the source image.

the step of processing the data of the target rows of the source image in the internal storage device to obtain the final image, including:

performing filling processing on the data of the target rows of the source image in the internal storage device to obtain the final image.

Furthermore, the source coordinate is mapped to the second coordinate, that is, the second coordinate can be represented by a functional expression of the source coordinate. Each coordinate is corresponding to a particular row and a particular column, and a row corresponding to the third coordinate can be understood as the row corresponding to a row coordinate which is corresponding to the third coordinate.

An alternative embodiment of the present disclosure can be thought as a way to perform scaling processing on an image after it is scaled.

Referring to FIG. 4 and FIG. 5, FIG. 4 is a schematic view of performing filling processing on an image after scaling it disclosed in the present disclosure. FIG. 5 is a schematic view of another coordinate transformation disclosed in the present disclosure. Furthermore, an embodiment of the filling processing shown in FIG. 4 is boundary mirroring processing. It should be noted although the embodiment of the present disclosure is only shown what is enumerated in FIG. 4, it is not limited to what is enumerated in FIG. 4, it can include other filling methods, such as constant filling processing, boundary value copying processing, which are not described repeatedly here. FIG. 5 is a schematic view of coordinate transformation before the image processing shown in FIG. 4.

Referring to FIG. 4, the second intermediate image is obtained after the source image is filled, furthermore, part 1 of the second intermediate image is located in the source image, in order to obtain the second intermediate image, the part 1 is mirrored upward to obtain part 2 of the second intermediate image, and then mirrored left to obtain part 3 of the second intermediate image, in this way, the second intermediate image can be obtained via completing filling processing on the source image. And then, it can be performed scaling processing on the second intermediate image to obtain the third image, finally, it can be performed filling processing on the third intermediate image to obtain the third image.

Referring to FIG. 5, an original coordinate is included in the second intermediate image before mapping it (figure a shown in FIG. 5), the part 1 of the second intermediate image is located in the source image, after mirroring the part 1 of the second intermediate image upward, and then mirroring the part 1 left, the coordinate are accordingly mapped to obtain figure b shown in FIG. 5, and then the figure b is mapped to the source image to obtain figure c shown in FIG. 5, since data of the left part of the figure c can be mapped to its right part via coordinate conversion, it can only need to read the data of the right part (as shown figure d of FIG. 5) rather than needing to read the data of the left part during reading the data, and then it is performed scaling processing on the read data, so as to obtain the third intermediate image (as shown figure e of FIG. 5). Furthermore, it is performed filling processing on the third intermediate image, so as to obtain the final image (as shown figure f of FIG. 5).

It can be seen from FIG. 4 and FIG. 5 that the final image can be obtained by performing filling processing on the third intermediate image, the third intermediate image can be obtained by performing scaling processing on the second intermediate image, and the second intermediate image can be obtained by performing filling processing on the source image, the coordinate of the second intermediate image can be represented by the coordinate of the source image, and then the coordinate of the third intermediate image can be represented by the coordinate of the source image, finally, the coordinate of the final image can also be represented by the coordinate of the source image, thus, it is can be known which rows of the source image are processed to the final image to read them into the internal storage device for calculation.

In an alternative embodiment of the present disclosure, the filling processing includes constant filling processing, boundary value copying processing and boundary mirroring processing.

Specifically, a specific implementation method of the above instructions performed by the processor 13 can be seen from the description of the relevant steps in corresponding embodiments shown in FIG. 1, not described it repeatedly here.

In the electronic apparatus 1 as shown in FIG. 7, before performing image processing on images, the electronic apparatus can be configured to perform coordinate conversion to determine that a final image is to be obtained by processing data of target rows of a source image, wherein the source image is stored in an external storage device, furthermore, the electronic apparatus can be configured to read the data of the target rows of the source image to an internal storage device from the external storage device, and then process the data of the target rows of the source image in the internal storage device to obtain the final image. It can be seen that, in an embodiment of the present disclosure, before performing image processing on images, the electronic apparatus can be configured to perform coordinate conversion to determine data to be cached, so that it can allow the data to be cached regardless of the size of the filling area, while reducing resource requirements for internal storage devices.

In some embodiments of the present disclosure, it can be understood that the disclosed systems, devices and methods can be implemented via other ways. For example, the device of the embodiment described above is only a schematic description, for example, the partition of the modules is only a logical function partition, which can be implemented via another way.

The modules described as separation parts can or can't be physically separated, and the parts displayed as modules can or can't be physical units, that is, they can be located in one place, or can be distributed on a plurality of network units. Some or all of the modules can be selected according to actual needs to implement the purpose of the present disclosure.

In addition, the functional modules in each embodiment of the present disclosure can be integrated in a processing unit, or each unit can be separately formed with a physical form, or two or more units can be integrated in one unit. The above integrated units can be implemented either in a hardware form or in the form of hardware plus software function modules.

It is obvious to one of ordinary skill in the related art that the present disclosure is not limited to the details of the above embodiments, and the present disclosure can be implemented in other concrete forms without deviating from the spirit or basic characteristics of the present disclosure. The foregoing descriptions are merely embodiments of the present disclosure, but not intended to limit the protection scope of the present disclosure, the scope of the present disclosure shall be subject to be appended claims rather than be the foregoing description. Accordingly, this specification and accompanying drawings are only exemplary descriptions of the present disclosure as defined by the claims and are deemed to cover any and all modifications, variations, combinations or equivalents within the scope of the present disclosure. Furthermore, it is obvious that the terms "include", "includes", "including" don't exclude other units or steps, and the singular does not exclude the plural. The multiple units or devices described in the system claims can also be implemented by a unit or a device through software or hardware. The meaning of the term "second" shown in the specification is only used to indicate names of elements of the present disclosure, but not indicated that the elements of the present disclosure is shown in any particular order, important or represented the amount of the elements.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. An image processing method comprising:
    performing coordinate conversion to determine that a final image is to be obtained by processing data of target rows of a source image, wherein the source image is stored in an external storage device;
    reading the data of the target rows of the source image to an internal storage device from the external storage device; and
    processing the data of the target rows of the source image in the internal storage device to obtain the final image; and wherein the step of performing coordinate conversion to determine that a final image is to be obtained by processing data of target rows of a source image, comprises:
    determining a first coordinate of a first intermediate image obtained by performing filling process on the source image, according to a source coordinate of the source image; determining rows corresponding to the first coordinate as the target rows of the source image, and determining that the final image is to be obtained by performing scaling processing on the data of the target rows of the source image; and
    the step of processing the data of the target rows of the source image in the internal storage device to obtain the final image, comprising:
    performing scaling processing on the data of the target rows of the source image in the internal storage device to obtain the final image.

2. The image processing method as claimed in claim 1, wherein the step of performing coordinate conversion to determine that a final image is to be obtained by processing data of target rows of a source image, comprises:
    a second coordinate of a second intermediate image obtained by performing filling processing on the source image, according to a source coordinate of the source image; determining a third coordinate of a third intermediate image obtained by performing scaling processing on the second intermediate image, according to the second coordinate; and determining rows corresponding to the third coordinate as the target rows of the source image, and determining that the final image is to be obtained by performing filling processing on the data of the target rows of the source image; and
    the step of processing the data of the target rows of the source image in the internal storage device to obtain the final image, comprising:
    performing filling processing on the data of the target rows of the source image in the internal storage device to obtain the final image.

3. The image processing method as claimed in claim 2, wherein the filling processing comprises constant filling processing, boundary value copying processing and boundary mirroring processing.

4. An image processing device comprising:
    a determining unit configured to perform coordinate conversion to determine that a final image is to be obtained by processing data of target rows of a source image, wherein the source image is stored in an external storage device;
    a reading unit configured to read the data of the target rows of the source image to an internal storage device from the external storage device; and
    a processing unit configured to process the data of the target rows of the source image in the internal storage device to obtain the final image; and wherein the determining unit configured to perform coordinate conversion to determine that a final image is to be obtained by processing data of target rows of a source image, comprises:
    determining a first coordinate of a first intermediate image obtained by performing filling process on the source image, according to a source coordinate of the source image; determining rows corresponding to the first coordinate as the target rows of the source image, and determining that the final image is to be obtained by performing scaling processing on the data of the target rows of the source image; and
    the processing unit configured to process the data of the target rows of the source image in the internal storage device to obtain the final image, comprising:
    performing scaling processing on the data of the target rows of the source image in the internal storage device to obtain the final image.

5. The image processing device as claimed in claim 4, wherein the determining unit configured to perform coordinate conversion to determine that a final image is to be obtained by processing data of target rows of a source image, comprises:
    determining a second coordinate of a second intermediate image obtained by performing filling processing on the source image, according to a source coordinate of the source image; determining a third coordinate of a third intermediate image obtained by performing scaling processing on the second intermediate image, according to the second coordinate; and determining rows corresponding to the third coordinate as the target rows of the source image, and determining that the final image is to be obtained by performing filling processing on the data of the target rows of the source image; and the processing unit configured to process the data of the target rows of the source image in the internal storage device to obtain the final image, comprising:
performing filling processing on the data of the target rows of the source image in the internal storage device to obtain the final image.

* * * * *